United States Patent [19]

Kipling

[11] 4,227,292

[45] Oct. 14, 1980

[54] PROCESS FOR REMANUFACTURING A MASTER CYLINDER

[75] Inventor: Edward R. Kipling, Dunwoody, Ga.

[73] Assignee: Rayloc, Atlanta, Ga.

[21] Appl. No.: 902,944

[22] Filed: May 4, 1978

[51] Int. Cl.³ .......................... B23P 7/00; B23P 15/00
[52] U.S. Cl. .................................. 29/402.04; 29/523;
29/DIG. 1; 29/156.4 WL; 29/402.06;
29/402.11
[58] Field of Search ............ 29/401 A, 401 B, 401 D,
29/401 F, 401 R, 156.4 WL, 523, DIG. 1,
527.5, 402.04, 402.06, 402.11, 402.12, 402.14,
402.18

[56] References Cited

U.S. PATENT DOCUMENTS

| | | | |
|---|---|---|---|
| 1,437,904 | 12/1922 | Moomaw | 29/156.4 WL |
| 1,619,479 | 3/1927 | Maupin | 29/156.4 WL |
| 2,424,878 | 7/1947 | Crook | 29/156.4 WL |
| 2,500,340 | 3/1950 | Boulton | 29/156.4 WL |
| 2,903,309 | 9/1959 | Brand | 29/156.4 WL X |
| 3,171,189 | 3/1965 | Hedgecock | 29/156.4 WL X |
| 3,828,415 | 8/1974 | Kammeraad et al. | 29/156.4 WL |

FOREIGN PATENT DOCUMENTS 574640 4/1924 France ............................ 29/156.4 WL Primary Examiner—Francis S. Husar
Assistant Examiner—V. K. Rising
Attorney, Agent, or Firm—Newton, Hopkins & Ormsby

[57] ABSTRACT

A worn or defective brake master cylinder is disassembled and degreased. The bore of the housing is reamed to a diameter somewhat larger than the desired finished bore diameter. A stainless steel tube is then cut to produce an insert sleeve of correct length for the housing bore and the outside diameter of the sleeve is ground to a slightly smaller diameter than the reamed diameter of the cylinder bore. The reamed bore and the exterior surface of the stainless steel sleeve are coated with an adhesive and the sleeve is inserted into the bore to the correct depth. The interior of the sleeve is then roller burnished to expand the sleeve into intimate contact with the bore. The sleeve is then drilled from the outside of the master cylinder to reopen all of the necessary ports in the master cylinder bore, following which the bore of the sleeve is honed to a very smooth finish.

3 Claims, 5 Drawing Figures

| Disassemble defective master cylinder, degrease and rust proof |

| Ream bore of cylinder housing somewhat larger than desired finished bore diameter and thoroughly clean |

| Cut stainless steel tube to make sleeve of correct length |

| Grind outside diameter of stainless steel sleeve until slightly smaller than reamed cylinder bore diameter |

| Coat reamed bore and exterior of sleeve with adhesive and press sleeve into bore of master cylinder to correct depth removing any excessive adhesive |

| Roller burnish interior of sleeve to expand it against cylinder bore |

| Reopen fluid ports by drilling through sleeve from outside of master cylinder |

| Hone inside of sleeve to a very smooth finish. Reassemble master cylinder, test and package. |

FIG 1

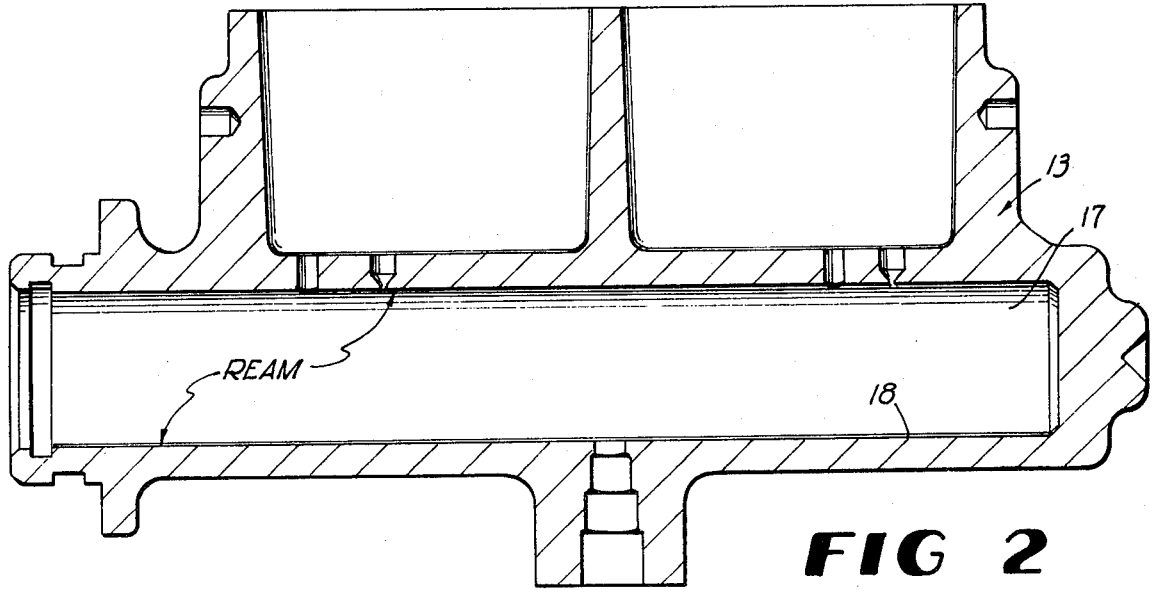

FIG 2

PROCESS FOR REMANUFACTURING A MASTER CYLINDER

BACKGROUND OF THE INVENTION

The constantly increasing cost of purchasing and maintaining automotive vehicles has increased the need for practical and economically feasible reconditioning or remanufacturing of certain troublesome components. Among these components is the well known brake master cylinder. In the past, when there was failure of the master cylinder, the customer was sold a new assembly at considerable cost. Furthermore, it is not uncommon for the new master cylinder to fail during the life of the vehicle requiring additional heavy expense for the vehicle owner.

The objective of this invention, therefore, is to provide a comparatively simple and economically feasible process whereby defective brake master cylinders can be remanufactured in such a manner that they will outlast a conventional new cylinder by a very large margin, thus ending once and for all, in most cases, the problem of master cylinder failure.

The prior art contains some general teachings relating to reconditioning and lining cylinder bores and the like, and to comply with the duty to disclose known prior art under 37 C.F.R. 1.56, the following U.S. Pat. Nos. are made of record herein: 1,437,904; 2,435,837; 1,915,817; 2,500,340; 2,424,873; 3,372,452; 3,803,687.

BRIEF DESCRIPTION OF THE DRAWINGS

FIG. 1 is a flow chart of the process.

FIG. 2 is a central vertical cross section taken through the master cylinder housing.

DETAILED DESCRIPTION

Figure 3:
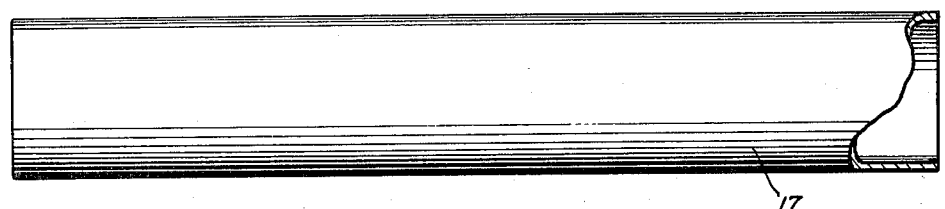
FIG. 3 is a side elevation of a sleeve or liner.

Referring to the drawings in detail wherein like numerals designate like parts, the remanufacturing process embodying the invention comprises the following steps.

Figure 5:
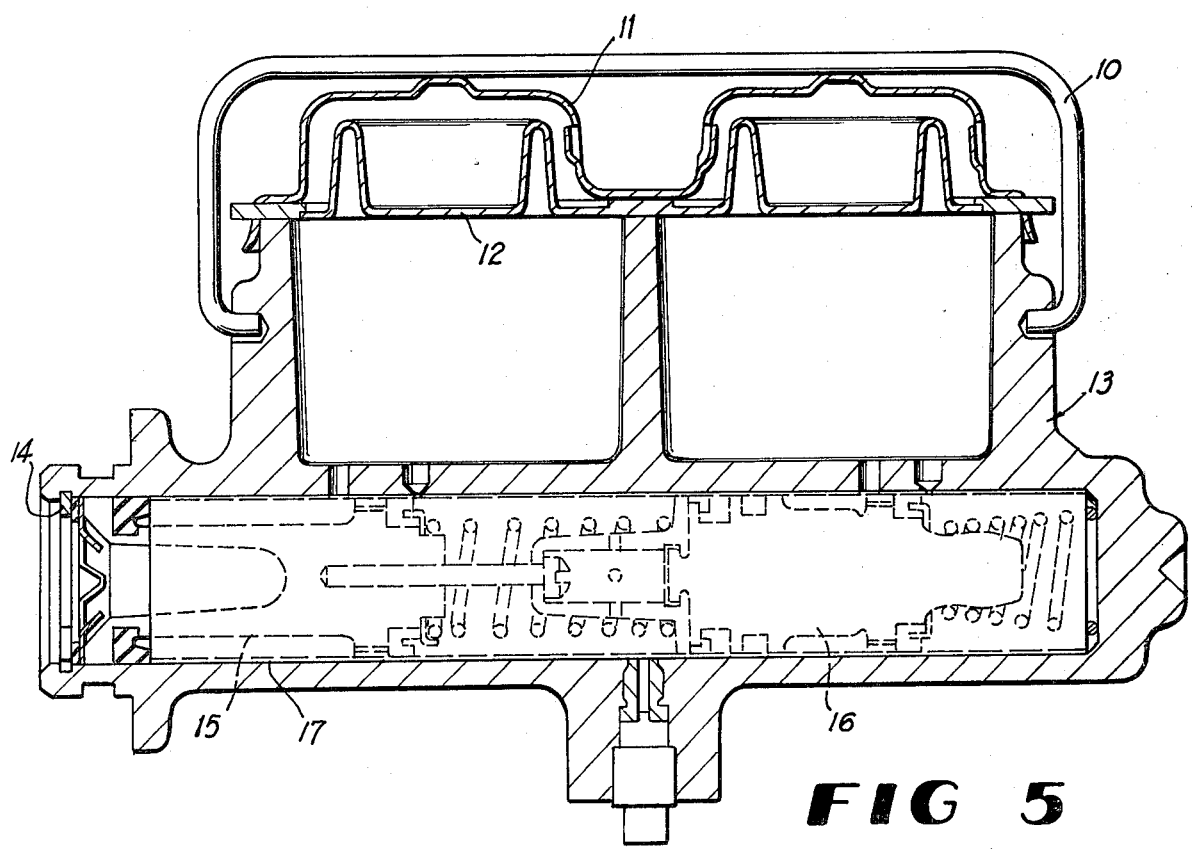
FIG. 5 is a cross sectional view of the completely reassembled remanufactured brake master cylinder.

The defective or old master cylinder assembly is completely disassembled by removing the bail wire 10, FIG. 5, and then the cap 11 and diaphragm 12 from the housing 13. The retaining ring 14 at the mouth of the cylinder bore is then removed and the primary and secondary pistons 15 and 16 are removed from the housing. The brass valve seats and the check valves (if present) are removed.

The empty housing, FIG. 2, is thoroughly degreased by subjecting it to the vapor of boiling perchlorethylene. The housing is then placed in a shot blaster and blasted with steel grit to remove all rust and corrosion.

The housing is then dipped in Nordall (made by Wyandotte Chemical Co.) in order to prevent rust. This is done in a large dip tank.

The housing 13 is now placed in an alignment jig which is mounted on a reamer. The bore of the housing is then reamed to a diameter which is 0.062 inches larger than the desired finished bore diameter. For example, a master cylinder having a one inch diameter bore is reamed to a diameter of 1.062 inches. The housing is then placed in perchlorethylene to remove all grease and provide a clean metal surface.

Stainless steel tubing, preferably Grade 304 is cut to form a cylindrical liner or sleeve 17 of the correct length for the particular master cylinder undergoing remanufacturing. The outside diameter of the stainless steel sleeve 17 is ground on a Cincinnati Centerless Grinder to a diameter which is 0.002 inches smaller than the reamed bore 18 of the housing 13. The grinding tolerance is held to plus or minus 0.0005 inches. The reamed bore 18 and the exterior surface of the stainless steel sleeve 17 are next coated with an adhesive, preferably Locktite 35, manufactured by Locktite Corp., Newington, Conn. The adhesive is applied to the bore and sleeve by brush.

Figure 4:
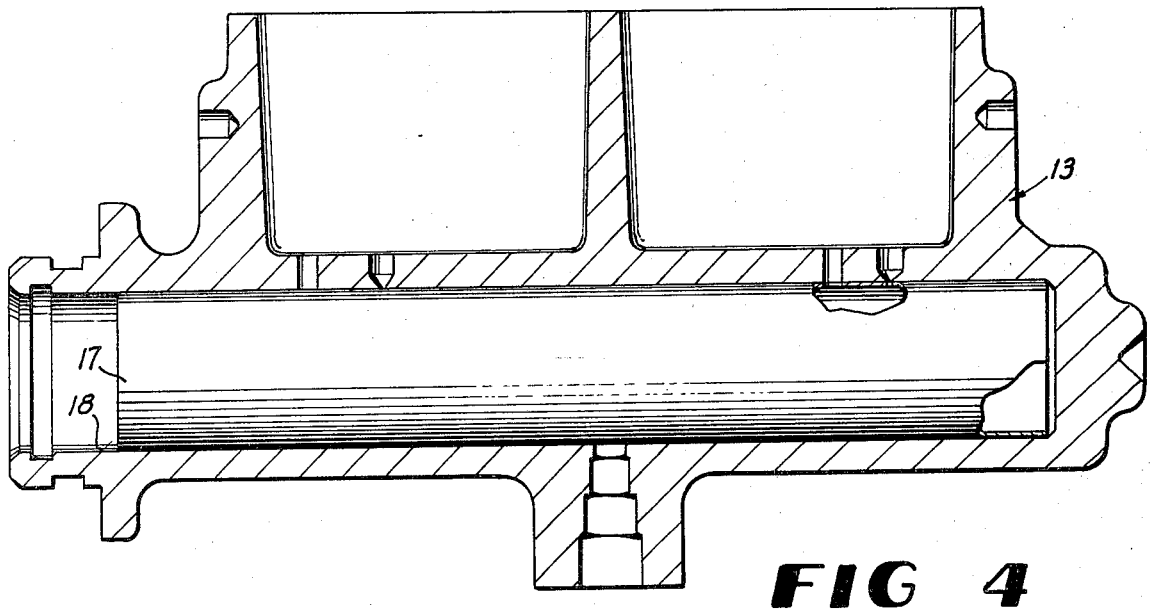
FIG. 4 is a view similar to FIG. 2 with the sleeve seated in the reamed bore of the master cylinder prior to the drilling of ports through the sleeve.

The coated sleeve is then pressed into the adhesive coated bore 18 to produce the sub-assembly shown in FIG. 4 and any excess of adhesive is removed near the mouth of the bore. An arbor press and appropriate tooling that seats the sleeve to the correct depth is employed.

Following this, in a very important process step, the interior of the sleeve 17 is roller burnished to expand the sleeve into intimate contact with the bore 18 so as to make a perfect fit between the bore and sleeve. This is preferably done with a roller burnishing tool made by Cogsdill Tool Products, Inc., Farmington Hills, Mich.

Next, the necessary fluid passages are reopened by use of high speed drill bits of the same diameters used to produce the original passages. Holes for the outlet ports, the compensating ports and the piston stop bolt are drilled through the wall of the sleeve 17 from the outside of the cylinder housing. A precision drill press is used for this operation.

Following the drilling, the bore of sleeve 17 is honed to a very smooth finish by means of honing stones. The primary and secondary piston assemblies 15 and 16 are rebuilt, inspected and installed in the honed sleeve 17, FIG. 5. The check valves are put in place and the brass seat inserts are pressed into position.

The assembled master cylinder is now tested, first with air pressure and vacuum to insure that it has no leaks between the primary and secondary sections. In a second test, the entire master cylinder is pressurized to determine if there is leakage around the primary piston. In a third test, the pressure chamber is pressurized and the piston is stroked to determine if there is any leakage around the cups at any point during piston travel. In another test, air is dumped from the reservoir through the pressure chamber to check the function of the piston check valves. In still another test, air is dumped from pressure chamber to reservoir to check the function of outlet port check valves. All five above tests are carried out automatically on special test equipment designed to meet the needs of the invention. If the remanufactured master cylinder fails any one of the five tests, it is automatically rejected by the test apparatus.

After each unit is thus tested, the cap 11 and bail wire 10 are installed and the remanufactured unit is packaged for shipment.

Among the advantages of the invention is the fact that the stainless steel sleeve 17 is almost completely resistant to pitting which is a major cause of master cylinder failure. This pitting is brought about by rust and corrosion of the usual cast iron cylinder due to impurities entering all brake fluid. A remanufactured brake master cylinder according to this invention will greatly outlast conventional cast iron cylinders and, in this sense, the remanufactured cylinder is superior to original equipment.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A method of remanufacturing a brake master cylinder comprising the steps of disassembling a defective brake master cylinder having a housing bore and a lateral port extending through its wall, degreasing the empty brake master cylinder housing, blasting the housing bore of the disassembled cylinder with a solid abrasive to remove rust and corrosion therefrom, rustproofing the empty cylinder housing, reaming said housing bore to a diameter slightly larger than the desired finished bore diameter of said cylinder making a corrosive resistant metal sleeve of proper length for insertion in said bore, grinding the exterior of the sleeve to a diameter slightly smaller than the diameter of the reamed housing bore, coating said bore and the exterior of said sleeve with adhesive, inserting said sleeve into said bore to a correct depth, removing excess adhesive near the mouth of the bore following said insertion, expanding the sleeve against the surface of the bore by roller burnishing the bore of the sleeve, drilling through the sleeve from the exterior of said housing to reopen said lateral port, and honing the interior of said sleeve to a smooth finish.

2. The method of claim 1 in which said step of reaming said housing bore consists in reaming the bore to a diameter which is approximately 0.062" larger than the desired finished bore diameter in the remanufactured device.

3. The method of claim 2 in which said step of grinding the exterior of the sleeve consists in grinding the exterior of said sleeve to an outer diameter which is approximately 0.002" smaller than the inner diameter of the reamed bore.

* * * * *